(12) United States Patent
Uratani

(10) Patent No.: US 10,529,056 B2
(45) Date of Patent: Jan. 7, 2020

(54) IMAGE ADJUSTING DEVICE AND IMAGE DISPLAY DEVICE, IMAGE ADJUSTING METHOD, AND STORAGE MEDIUM STORING PROGRAM FOR IMAGE ADJUSTMENT

(71) Applicant: Sharp Kabushiki Kaisha, Osaka (JP)

(72) Inventor: Osamu Uratani, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/238,899

(22) Filed: Aug. 17, 2016

(65) Prior Publication Data

US 2017/0061583 A1 Mar. 2, 2017

(30) Foreign Application Priority Data

Aug. 28, 2015 (JP) .................................. 2015-168497

(51) Int. Cl.
*G06T 5/00* (2006.01)
*G06T 7/00* (2017.01)
*G09G 5/00* (2006.01)

(52) U.S. Cl.
CPC .............. *G06T 5/00* (2013.01); *G06T 7/0002* (2013.01); *G09G 5/003* (2013.01); *G06T 2207/20172* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 6,739,767 B2* | 5/2004 | Ikeda | ..................... | G03B 27/32 348/223.1 |
| 8,111,744 B2* | 2/2012 | Kim | .................... | H04N 1/00098 375/240.01 |
| 2004/0075754 A1 | 4/2004 | Nakajima et al. | | |
| 2004/0135889 A1* | 7/2004 | Koizumi | ............ | H04N 1/00167 348/207.1 |
| 2005/0280716 A1* | 12/2005 | Toyoda | .................. | H04N 5/335 348/222.1 |
| 2006/0198437 A1* | 9/2006 | Kim | ................... | H04N 1/00098 375/240.01 |

(Continued)

FOREIGN PATENT DOCUMENTS

JP     H10-275074 A     10/1998
JP     2000-196937 A     7/2000

(Continued)

*Primary Examiner* — Andrae S Allison
(74) *Attorney, Agent, or Firm* — ScienBiziP, P.C.

(57) ABSTRACT

To provide an image adjusting device and image display device which can automatically optimally change display image quality settings on the display side based on settings by the user who prepares the image contents, and implement an automatic slide show, as well as an image adjusting method, and a program for image adjustment. An image quality adjusting device for adjusting an image quality of a plurality of images sequentially displayed by a slide show, comprising an adjusting means which adjusts on image by image basis the image quality when displaying the plurality of images, based on information which respectively coordinates image data respectively corresponding to an individual image included in the plurality of images.

13 Claims, 9 Drawing Sheets

(56) References Cited

U.S. PATENT DOCUMENTS

| | | | | |
|---|---|---|---|---|
| 2007/0053554 A1* | 3/2007 | Fayad | ................... | A61B 5/055 |
| | | | | 382/128 |
| 2007/0242898 A1* | 10/2007 | Kato | ....................... | H04N 5/57 |
| | | | | 382/274 |
| 2009/0091654 A1* | 4/2009 | Nakamura | ........... | H04N 1/2166 |
| | | | | 348/469 |
| 2010/0302447 A1* | 12/2010 | Shirai | ..................... | H04N 9/73 |
| | | | | 348/607 |
| 2013/0250077 A1* | 9/2013 | Kimura | ............... | H04N 9/8205 |
| | | | | 348/61 |

FOREIGN PATENT DOCUMENTS

| | | | |
|---|---|---|---|
| JP | 2002-314936 A | | 10/2002 |
| JP | 2010-103607 A | | 5/2010 |
| JP | 2010-278530 | * | 9/2010 |
| JP | 2010-278530 A | | 12/2010 |

\* cited by examiner

| FUNCTION | | | "A" PART | | | | "B" PART | | | PARAMETER CHARACTERS | EXPLANATION OF PART FUNCTION |
|---|---|---|---|---|---|---|---|---|---|---|---|
| IMAGE QUALITY SWITCHING | | | A | V | M | D | 0 | 0 | 0 | 4 | (TOGGLE) |
| | | | A | V | M | D | 0 | 0 | 1 | 4 | AV |
| | | | A | V | M | D | 0 | 0 | 2 | 4 | MOVIE |
| | | | A | V | M | D | 0 | 0 | 3 | 4 | GAME |
| | | | A | V | M | D | 0 | 0 | 6 | 4 | DYNAMIC |
| | | | A | V | M | D | 0 | 0 | 7 | 4 | PC |
| | | | A | V | M | D | 0 | 0 | 9 | 4 | sRGB |
| | | | A | V | M | D | 0 | 1 | 1 | 4 | PHOTO |
| | | | A | V | M | D | 0 | 2 | 0 | 4 | HIGH DEFINITION |
| PICTURE ADJUSTING | BRIGHTNESS | | V | L | M | P | * | * | * | 4 | BRIGHTNESS SETTING [-016 ~ 0016] |
| | CONTRAST | | C | O | N | T | * | * | * | 4 | CONTRAST SETTING [0000 ~ 0040] |
| | BLACK LEVEL | | B | L | V | L | * | * | * | 4 | BLACK LEVEL SETTING [-030 ~ 0030] |
| | COLOR DENSITY | | C | O | L | R | * | * | * | 4 | COLOR DENSITY SETTING [-030 ~ 0030] |
| | TINT | | T | I | N | T | * | * | * | 4 | TINT SETTING [-030 ~ 0030] |
| | SHARPNESS | | S | H | R | P | * | * | * | 4 | IMAGE QUALITY SETTING [0000 ~ 0020] |

FIG. 3

| PHOTOGRAPH TYPE | DISPLAY MODE |
|---|---|
| LANDSCAPE | MOVIE |
| NOCTURNAL SCENE | HIGH DEFINITION |
| INDOORS | PC |
| PORTRAIT | PHOTO |
| SPORTS | DYNAMIC |

FIG. 4

STEP-A

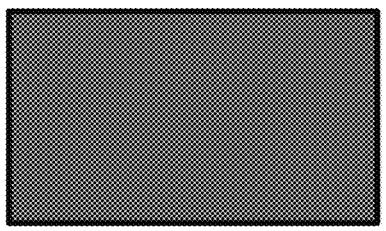

START OF AUTOMATIC SLIDE SHOW
⇒DISPLAY MODE: "PHOTO" (DEFAULT)

STEP-B

"AVMD0007" IN Exif "COMMENT"
FIELD OF NEXT IMAGE
⇒CHANGE DISPLAY MODE TO "PC"

DISPLAY NEXT IMAGE

"CONT0025" IN Exif "COMMENT"
FIELD OF NEXT IMAGE
⇒CHANGE TO DISPLAY MODE
"PHOTO" "BRIGHTNESS: 5"

STEP-C

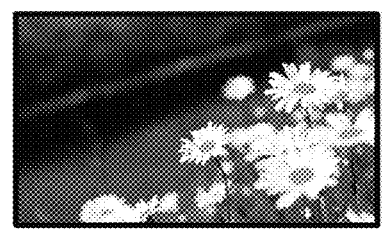

DISPLAY NEXT IMAGE

"CONT0025" IN Exif "COMMENT"
FIELD OF NEXT IMAGE
⇒CHANGE TO DISPLAY MODE
"CONTRAST: 25"

STEP-D

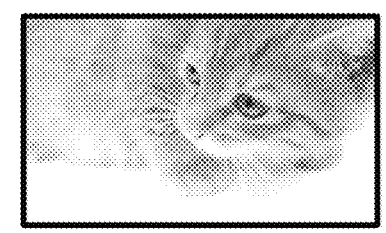

DISPLAY NEXT IMAGE
NOTHING IN Exif "COMMENT" FIELD
OF NEXT IMAGE
"NOCTURNAL SCENE" IN Exif
"PHOTOGRAPH TYPE" FIELD OF
NEXT IMAGE
⇒CHANGE TO DISPLAY MODE
"HIGH DEFINITION"

STEP-E

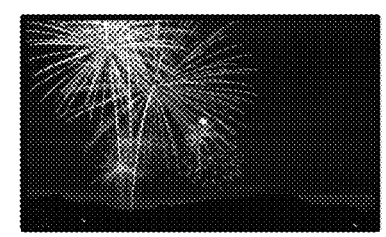

DISPLAY NEXT IMAGE

NOTHING IN Exif "PHOTOGRAPH
TYPE" FIELD OF NEXT IMAGE
NOTHING IN Exif "PHOTOGRAPH
TYPE" FIELD OF NEXT IMAGE
⇒CHANGE TO DEFAULT SETTING:
DISPLAY MODE "PHOTO"

STEP-F

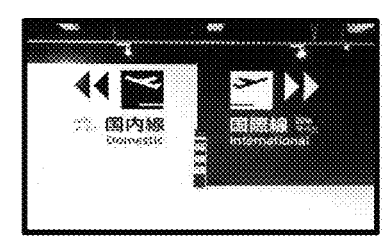

DISPLAY NEXT IMAGE

FIG. 5

IMAGE ADJUSTING DEVICE AND IMAGE DISPLAY DEVICE, IMAGE ADJUSTING METHOD, AND STORAGE MEDIUM STORING PROGRAM FOR IMAGE ADJUSTMENT

This application is based on and claims the benefit of priority from Japanese Patent Application No. 2015-168497, filed on 28 Aug. 2015, the content of which is incorporated herein by reference.

BACKGROUND OF THE INVENTION

Field of the Invention

The present invention relates to an image adjusting device and image display device, an image adjusting method, and a storage medium storing a program for image adjustment, and in particular relates to an image adjusting device and image display device for adjusting the image quality of a plurality of images sequentially displayed in a slide show, an image adjusting method, and a storage medium storing a program for image adjustment.

Related Art

In conventional signage displays, there is the function of reading image files stored on USB memory devices or internal memory of the main device and displaying an automatic slide show.

In this case, the image quality mode and the display image quality settings such as the brightness, contrast and the like of the display are set in advance in a setting menu, and if it is desired to change the display image quality according to the displayed image contents, it is necessary to change the display image quality settings each time by a remote control operation.

Further, for the case of displays for which contents can be distributed via a network, it is possible to change the display image quality mode by a command operation via the network.

For example, Japanese Unexamined Patent Application, First Publication No. 2010-278530 discloses an invention which, in an image display device which displays acquired image information, acquires the image information and Exif information corresponding to the image information from an external device by an HDMI (registered trademark) signal, and performs image quality adjustment based on the Exif information.

However, Exif information is basically used for adjustment consistent with the image, and it is not intended for use for adjustment consistent with the display device.

Further, in a display where image content is distributed via a network as in the invention disclosed in Japanese Unexamined Patent Application, First Publication No. 2010-278530, if it is desired to change the display mode according to each image content, a command must be transmitted each time from the outside via the network. However, in consideration of the timing of the display, it is difficult to input a command from the outside via the network, and at the same time, it is also difficult to respond to a command input from the outside by only the side of a user preparing the image contents.

The present invention was made in consideration of such problems, and has the objective of providing an image adjusting device and image display device which is capable of executing an automatic slide show, after having automatically changed to an optimal display image quality setting on the display side, based on settings by the user preparing the image contents, an image adjusting method, and a storage medium storing a program for image adjustment.

SUMMARY OF THE INVENTION

The first aspect of the present invention provides an image adjusting device for adjusting an image quality of a plurality of images sequentially displayed by a slide show, comprising an adjusting means which adjusts on image by image basis the image quality of the plurality of images, based on each information corresponding to each image included in the plurality of images.

The second aspect of the present invention is an image adjusting method for adjusting an image quality of a plurality of images sequentially displayed by a slide show, comprising an adjusting step of adjusting on image by image basis the image quality of the plurality of images, based on each information corresponding to each image included in the plurality of images.

The third aspect of the present invention is a storage medium which is a non-transitory storage medium and which stores a program for image adjustment for making a computer function as an image quality adjusting device for adjusting an image quality of a plurality of images sequentially displayed by a slide show, which makes the computer function as an adjusting means which adjusts on image by image basis the image quality of the plurality of images, based on each information corresponding to each image included in the plurality of images.

According to the present invention, it becomes possible to optimize the image quality settings when displaying on a display in response to only the side preparing the image contents.

BRIEF DESCRIPTION OF THE DRAWINGS

FIG. 3 is a drawing showing the image quality setting commands used in an image display device according to the first embodiment of the present invention.

FIG. 4 is a drawing showing a correspondence relationship between the photograph type information and the display mode used in an image display device according to the first embodiment of the present invention.

FIG. 5 is a drawing showing an example of an image display device according to the first embodiment of the present invention.

DETAILED DESCRIPTION OF THE INVENTION

Embodiments of the present invention are explained with reference to FIGS. 1 to 9.

First Embodiment

First, the image adjusting device and image display device according to the first embodiment of the present invention are explained using FIG. 1 to FIG. 4.

Figure 1:
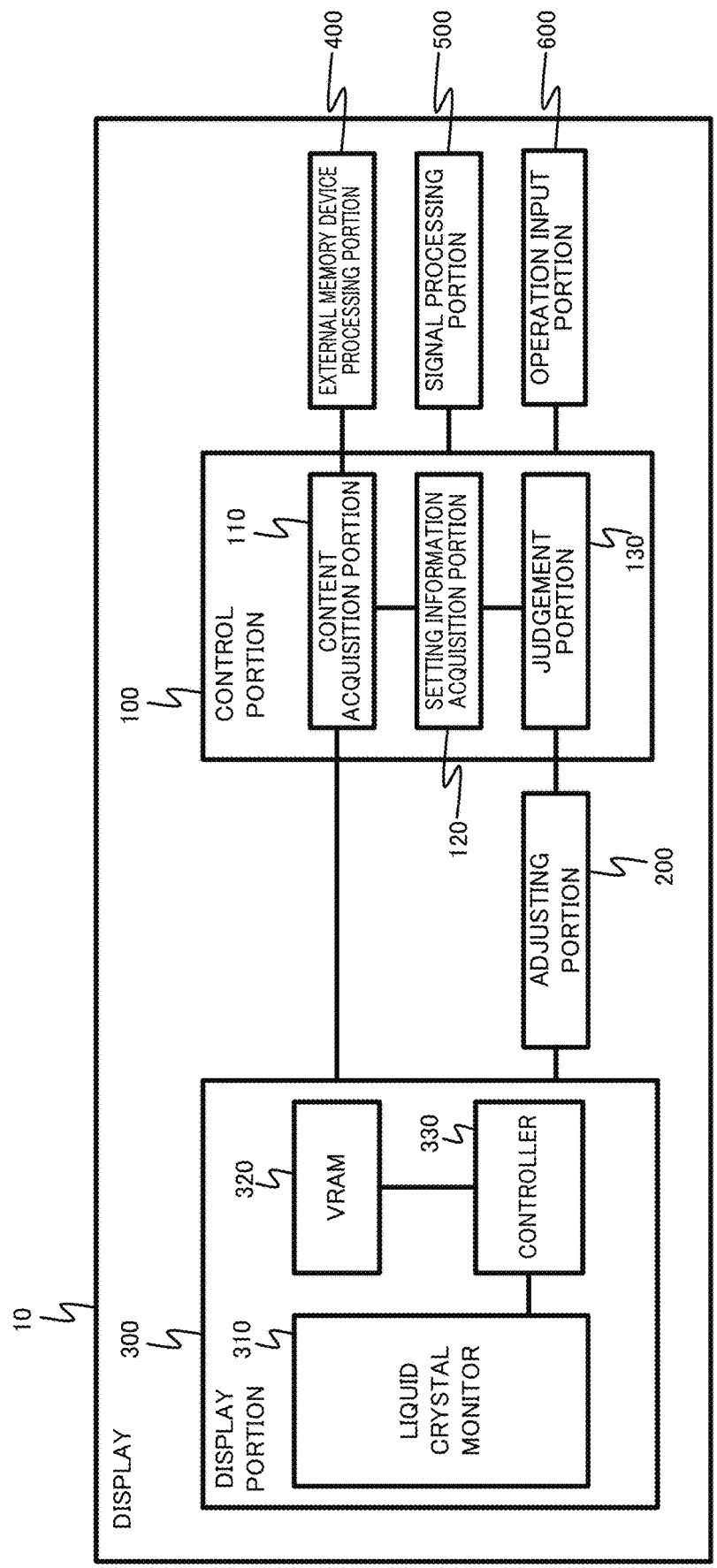
FIG. 1 is a block diagram of the image display device according to the first embodiment of the present invention.

FIG. 1 is a drawing showing the constitution of the display 10 according to the first embodiment of the present invention. The display 10 has a control portion 100, adjusting portion 200, display portion 300, external memory device processing portion 400, signal processing portion 500, and operation input portion 600. Among these, in the present invention, the display 10 is referred to as the "image display device". Further, in the present invention, the control portion 100 and the adjusting portion 200 together are referred to as the "image adjusting device".

The control portion 100 is a control portion which controls the display 10 overall, and may be a microprocessor, an FPGA (Field Programmable Gate Array) which is an LSI (Large Scale Integration circuit) which can be programmed, an ASIC (Application Specific Integrated circuit) which is an integrated circuit designed and produced for a specific application, or any other circuit having other logic functions. Further, while not shown in the figures, a ROM (Read Only Memory) for storing a program executed by the control portion 100, and/or a RAM (Random Access Memory) used as a work memory temporarily recording data, which is data accessed by the control portion 100 may be connected to the control portion 100.

Further, the control portion 100 has a content acquisition portion 110, a setting information acquisition portion 120, and a judgment portion 130. The content acquisition portion 110 acquires each image file of the image contents from the external memory device processing portion 400 and at the same time transmits to the display portion 300 image data in each image file. The setting information acquisition portion 120 acquires each image quality setting information from each image file acquired by the content acquisition portion 110. The judgment portion 130 judges whether to change the display image quality of each image when each image is displayed, based on each image quality setting information acquired by the setting information acquisition portion 120. The detailed functions of these constituent elements is described later.

The adjusting portion 200 adjusts the display image quality setting when displaying each image, before the display portion 300 displays each image which the content acquisition portion 110 of the control portion 100 has transmitted to the display portion 300, based on the judgment results by the above mentioned judgment portion 130.

The display portion 300 is the location which displays image data input from the content acquisition portion 110 of the control portion 100, for example it may be a liquid crystal monitor module device. Further, the display portion 300, in the same way as a display portion used in a conventional signage display, has a liquid crystal monitor 310, VRAM (Video RAM) 320, and a controller 330 which controls the liquid crystal monitor 310 and the VRAM 320.

The external memory device processing portion 400 is a data processing portion for an external memory device such as a USB memory or the like.

The signal processing portion 500 is a processing portion which processes an input picture signal from a PC or AV device or the like connected to the display 10.

The operation input portion 600 is an input portion which receives operations from a user, for example, it may be implemented by a remote control, a keyboard or the like.

Figure 2:
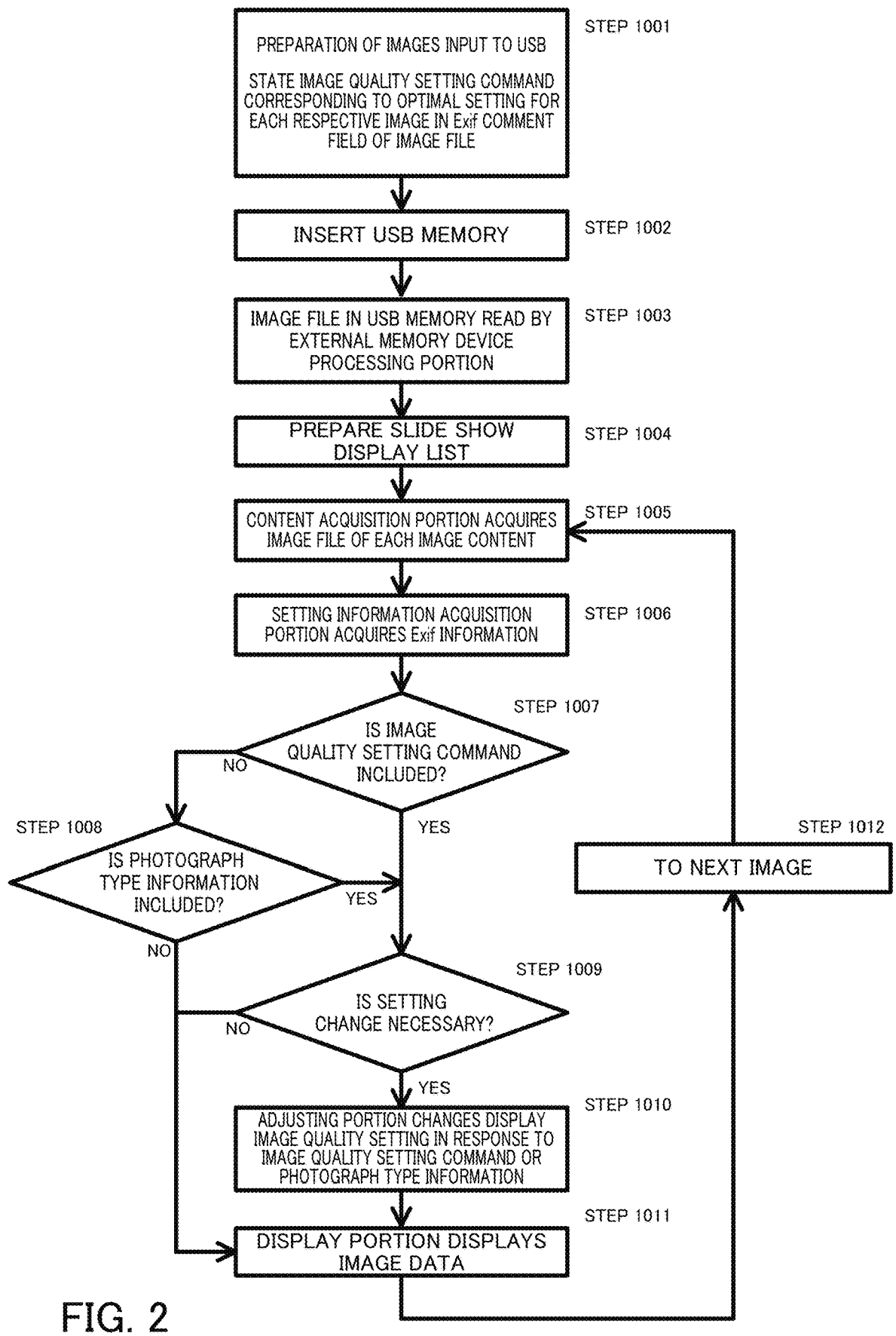
FIG. 2 is a drawing showing an operation flow of the image display device according to the first embodiment of the present invention.

Next, the flow of the operation of the display 10 of the present invention is described using FIG. 2.

Herein, a description is given for the situation where, in the image file of each image, an image quality setting command is stated in the comment field in the Exif information, but the embodiments of the present invention are not limited to this. For example, the image quality setting command may be stated in the MakerNote field instead of the comment field in the Exif information, or the image quality setting command may be stated in a separate file linked to the image file of each image.

First, in STEP 1001, the user records an image file corresponding to image contents used in an automatic slide show on an external memory device, for example a USB memory, which will be connected to the external memory device processing portion 400 of FIG. 1. At the same time, an image quality setting command corresponding to the optimal display image quality for each respective image content is stated in the comment field in the Exif information of the image file corresponding to each image content.

Herein, one example of the image quality setting commands is shown in FIG. 3.

The image quality setting commands include an image quality switching command and a picture adjusting command.

The image quality switching command is a command which sets one display mode consisting of a combination of a plurality of attribute values, of the display image quality when displaying each image content.

The picture adjusting command is a command which sets a combination of one type of attribute, and an increase or decrease value from a standard value of that attribute, of a display image quality when displaying each image content.

Further, each command is constituted by a combination of four alphabetic characters and a four digit number. However, the embodiments of the present invention are not limited to this.

The image quality switching command is constituted of a combination of the four alphabetic characters "AVMD" and a four digit number. Herein, the command "AVMD0000" where the four digit number is "0000" is a command provided for toggle use. Further, the command "AVMD0001" where the four digit number is "0001" is a command which sets the image quality mode to "AV". Herein, in the mode "AV", the set of attribute values of [brightness, contrast, black level, color density, tint, sharpness] is, for example, [0005, 0010, 0005, 0010, 0000, 0003]. Namely, by stating the command "AVMD0001" in the comment field of the Exif information, an image is displayed where the display image quality of the display mode "AV" is such that the attribute values of [brightness, contrast, black level, color density, tint, sharpness] are [0005, 0010, 0005, 0010, 0000, 0003]. Of course, the combination of attributes is not limited to [brightness, contrast, black level, color density, tint, sharpness]. Namely, they may be only part of these attributes, or other attributes may also be included. Further, the combination of the attribute values of the image quality mode "AV" of

[brightness, contrast, black level, color density, tint, sharpness]=[0005, 0010, 0005, 0010, 0000, 0003]

is merely an example, and it may be a combination of other values.

In the same way below, "AVMD0002" is a command for setting a display mode referred to as "movie". "AVMD0003" is a command for setting a display mode referred to as "game". "AVMD0006" is a command for setting a display mode referred to as "dynamic". "AVMD0007" is a command for setting a display mode referred to as "PC". "AVMD0009" is a command for setting a display mode referred to as "sRGB". "AVMD0011" is a command for setting a display mode referred to as "photo". "AVMD0020" is a command for setting a display mode referred to as "high definition". The combinations of attribute values for each of these respective display modes are different.

On the other hand, the picture adjusting command is a command setting an increase or decrease value compared to a standard value, in each attribute constituting the combination of the plurality of attributes which are the "display mode". For example, in the case of setting [brightness], "VLMP" is used as the four alphabetic characters, and following this, an increase or decrease value is set within a range of −16 to 16. For example, if it is desired to adjust by increasing by 10 the [brightness] compared to the standard value, the command "VLMP0010" is stated in the comment field of the Exif information. Herein, the range of the increase or decrease value was taken as −16 to 16, but the embodiments of the present invention are not limited to this range.

Below, in the same way, in the case of setting an increase or decrease value of the [contrast] compared to the standard value, the command "CONT**" is stated (where in the part "", any number of 0000 to 0040 is input). In the case of setting an increase or decrease value of the [black level] compared to the standard value, the command "BLVL" is stated (where in the part "", any number of −030 to 0030 is input). In the case of setting an increase or decrease value of the [color density] compared to the standard value, the command "COLR" is stated (where in the part "", any number of −030 to 0030 is input). In the case of setting an increase or decrease value of the [tint] compared to the standard value, the command "TINT" is stated (where in the part "", any number of −030 to 0030 is input). In the case of setting an increase or decrease value of the [sharpness] compared to the standard value, the command "SHRP" is stated (where in the part "**", any number of 0000 to 0020 is input). Of course, an attribute set by the picture adjusting command is not limited to the above mentioned [brightness], [contrast], [black level], [color density], [tint], and [sharpness]. Namely, it may be such that only a part of these is settable, on the other hand it may be that an increase or decrease value compared to the standard value of attributes other than these are also settable. Further, the ranges of the increase or decrease values are not limited to those mentioned above.

Herein, in the picture adjusting command, the values used as the standard values of each attribute differ depending on whether only the picture adjusting command is stated in the comment field of the Exif information, or whether the picture adjusting command is stated along with an image quality switching command.

In the case that only the picture adjusting command is stated in the comment field of the Exif information, the attribute value of the default display mode it taken as the standard value, and the display mode is set to a value increased or decreased by only the increase or decrease value of the attribute indicated by the picture adjusting command from this standard value. For example, when the default attribute values are "photo", the combination of attribute values of "photo" is

[brightness, contrast, black level, color density, tint, sharpness]=[0000, 0010, 0010, 0020, 0000, 0015], and in the case that only "CONT0030" is stated in the comment field of the Exif information, the combination of attribute values set by the image quality setting command becomes

[brightness, contrast, black level, color density, tint, sharpness]=[0000, 0040, 0010, 0020, 0000, 0015].

On the other hand, if both of the image quality switching command and the picture adjusting command are stated in the comment field of the Exif information, the attribute values of the display mode indicated by the stated image quality switching command are taken as the standard values, and from these standard values, the display mode is set to the value increased or decreased from the standard value by the increase or decrease value amount for only the attribute value indicated by the picture setting command. For example, in the case that "AVMD0001/BLVL-005" is stated in the comment field of the Exif information, the combination of the attribute values set by the image quality setting command becomes a display mode where, from the attribute values of the display mode "AV", the attribute value of only the [black level setting] is reduced by only 5. Specifically, the display mode becomes

[brightness, contrast, black level, color density, tint, sharpness]=[0005, 0010, 0000, 0010, 0000, 0003].

Further, a plurality of picture adjusting commands may be stated.

Returning to FIG. 2, in STEP 1002, the user inserts a USB memory recording an image file of an image used in the automatic slide show into the display 10.

Next, in STEP 1003 the external memory device processing portion 400 of the display 10 sequentially reads the image files in the USB memory.

Next, in STEP 1004, the user produces a slide display list of the image files used in the automatic slide show. For example, the user may use a method of using a specialized application not shown in FIG. 1, to set which image files among all of the image files read in STEP 1003 are used in the automatic slide show, and to set the sequence to display these images, and the like.

Next, in STEP 1005, the content acquisition portion 110 acquires an image file corresponding to the first image content to be displayed in the image files used in the automatic slide show.

Next, in STEP 1006, the setting information acquisition portion 120 acquires the Exif information in the image file acquired by the content acquisition portion 110.

Next, in STEP 1007, the judgment portion 130 judges whether or not an image quality setting command is included in the comment field of the Exif information acquired by the content acquisition portion 110.

In STEP 1007, if an image quality setting command is included in the comment field of the Exif information (STEP 1007 is Yes), the flow proceeds to STEP 1009.

In STEP 1007, if an image quality setting command is not included in the comment field of the Exif information (STEP 1007 is No), the flow proceeds to STEP 1008.

In STEP 1008, the judgment portion 130 judges whether or not photograph type information is included in the Exif information.

Herein, "photograph type" may also be called "scene mode" or "scene select" depending on the manufacturer, and is the photograph type selected in the camera when the user photographs an image corresponding to each image file with the camera. Specifically, it is a photograph type selected by a user as an optimal photograph setting for a specific scene. The table disclosed in FIG. 4 is a table disclosing the relationship of correspondence between these photograph types and the display mode for each photograph type. Based on this table, the judgment portion 130 judges whether the image type information stated in the Exif information corresponds to any of the display modes indicated in the "image quality switching command" disclosed in FIG. 3. As shown in FIG. 4, for example, if the photograph type is "landscape", this corresponds to the "movie" display mode. If the photograph type is "nocturnal scene", this corresponds to the "high definition" display mode. If the photograph type is "indoors", this corresponds to the "PC" display mode. If the photograph type is "portrait", this corresponds to the "photo" display mode. If the photograph type is "sports", this corresponds to the "dynamic" display mode. Further, the relationships of correspondences between the photograph types and display modes disclosed in FIG. 4 are merely one example, and the embodiments of the present invention are not limited by the relationships of correspondence disclosed in FIG. 4.

In STEP 1008, if it is judged that photograph type information is included in the Exif information (STEP 1008 is Yes), the flow proceeds to STEP 1009.

In this way, even if in STEP 1007 it is judged that an image quality setting command is not included in the comment field of the Exif information, if in STEP 1008 it is judged that photograph type information is included in the Exif information, the flow proceeds to STEP 1009 in the same way as if STEP 1007 were Yes.

Next, in STEP 1009, the judgment portion 130 judges whether or not the display image quality setting indicated by the image quality setting command or the photograph type information differs from the display image quality setting at the present time, namely, it judges whether or not it is necessary to change the display image quality setting of the displayed image. If it is necessary to change the display image quality setting of the displayed image (STEP 1009 is Yes), the flow proceeds to STEP 1010.

Next, in STEP 1010, the adjusting portion 200 changes the display image quality setting in response to the image quality setting command or the photograph type information.

Next, in STEP 1011, based on the display image quality setting changed in STEP 1010, the display portion 300 displays the image data in the image file.

Next, if the display time of the image data has exceeded a predetermined time, the flow proceeds to STEP 1012, namely, the display step of the next image.

Further, if STEP 1007 was No and STEP 1008 was also No, then if STEP 1009 was also No, the flow proceeds to STEP 1011. In this case, the image is displayed with the default display mode.

Above, using the flowchart disclosed in FIG. 2 and the tables disclosed in FIG. 3 and FIG. 4, the use method of the display 10 of the present invention was described, but the image quality setting command may be stated in the MakerNote field and not in the comment field of the Exif information as described above. In this case, in STEP 1007, it is judged whether or not an image quality setting command is stated in the MakerNote field, not in the comment field of the Exif information.

Further, as described above, the image quality setting command may be stated in a separate file linked to the image file of each image. In this case, in STEP 1007, it is judged whether or not an image quality setting command is stated in the separate file, not in the comment field of the Exif information.

Further, the image quality setting command may be embedded in the image itself. Specifically, a string of characters may be embedded in the form of an image in a corner of the image, a character code may be embedded in the form of an image, or a string of characters and a character code may be embedded in the form of a digital watermark. In such a case, in STEP 1007, it is judged whether or not an image quality setting command is stated by image recognition of the image itself, not in the comment field of the Exif information.

Further, in the above flow, first in STEP 1007, it is judged whether or not an image quality setting command is included in the Exif information, and if an image quality setting command is not included, in STEP 1008 it is judged whether or not photograph type information is included in the Exif information, but this sequence may be reversed. Namely, it is possible to first judge whether or not photograph type information is included in the Exif information, and if photograph type information is not included, it is judged whether or not an image quality setting command is included in the Exif information.

Further, in the above explanation, in order to simplify the explanation, a description was given for a situation where the two commands of the image quality switching command and the picture adjusting command are stated in the Exif information, but the embodiments of the present invention are not limited to this, and the situation may be so as to respond to other commands. For example, it may be a situation of zooming the image using a command setting the screen size, or making a wide display of the image.

Further, a situation where adjustment is not possible can be conceived, for example, in STEP 1007 it is judged that an image quality setting command is stated in the Exif information, and in STEP 1008 it is judged that photograph type information is stated in the Exif information, but an error is generated for the reason that the stated image quality setting command and photograph type information do not correspond to the specifications of the display 10, or the like. In such a case, the display of the image to be displayed next is cancelled, and the display of the currently displayed image may be continued, or the image following the image to be displayed next may be displayed, or a preset image may be displayed.

Next, an example of the actual use of the display 10 is explained with reference to FIG. 5.

The image of STEP-A shows a display screen at the start of an automatic slide show. At the start, the liquid crystal monitor 310 of the display portion 300 does not display anything, and in the initial setting (default), the display mode is "photo".

Next, it is assumed that "AVMD0007" is stated in the comment field of the Exif information of the first image to be displayed (the landscape image shown in FIG. 5). According to the table disclosed in FIG. 3, this "AVMD0007" is understood to be a command, among the image quality switching commands, for setting the display mode to "PC". In this way, the adjusting portion 200 changes the display mode to "PC".

Next, in STEP-B, the display portion 300 displays the landscape image in the state where the display mode has been set to "PC".

Next, it is assumed that "AVMD0002/VMLP0005" is stated in the comment field of the Exif information of the image to be displayed next (the flower image shown in FIG. 5). According to the table disclosed in FIG. 3, this "AVMD0002/VMLP0005" is understood to be a command, among the image quality switching commands, for setting the display mode to "movie", and a command, among the picture adjusting commands, for setting the attribute value of [brightness] to increase by only 5. From this, the adjusting portion 200, at the same time that the display mode is the "movie" image quality mode, changes the display mode such that only the attribute value of the [brightness] thereof is increased by only 5 from the attribute value of the "movie" display mode.

Next, in STEP-C, at the same time that the display mode is "movie", the display portion 300 displays the flower image in a display mode where only the attribute value of [brightness] thereof is increased by only 5 from the attribute value of the display mode of "movie".

Next, it is assumed that "CONT0025" is stated in the comment field of the Exif information of the image to be displayed next (the picture of the cat shown in FIG. 5). According to the table disclosed in FIG. 3, this "CONT0025" is understood to be a command, among the picture adjusting commands, for increasing the attribute value of the [contrast] by only 25 from the default attribute value of "photo". From this, the adjusting portion 200, at the same time that the display mode is the "photo" display mode, changes the display mode such that only the attribute value of [contrast] thereof is increased by only 25 from the attribute value of the display mode of "photo".

Next, in STEP-D, at the same time that the display mode is "photo", the display portion 300 displays the cat image in a display mode where only the attribute value of the [contrast] thereof is increased by only 25 from the attribute value of the "photo" display mode.

Next, is it assumed that nothing is stated in the comment field of the Exif information of the next image to be displayed (the fireworks image shown in FIG. 5), and in the photograph type information field it is stated that this is a photograph type of "nocturnal scene". It can be understood from the table disclosed in FIG. 4 that when the photograph type information is "nocturnal scene" the corresponding display mode is "high definition". From this, the adjusting portion 200 changes the display mode to the display mode of "high definition".

Next, in STEP-E, the display portion 300 displays the image of the fireworks in a state where the display mode has been set to "high definition".

Next, is it assumed that nothing is stated in both the comment field and the photograph type information of the Exif information of the next image to be displayed (the airport image shown in FIG. 5). From this, the adjusting portion 200 changes the display mode to the default "photo" display mode.

Next, in STEP-F, the display portion 300 displays the airport image in the state where the display mode has been set to "photo".

As is clear from the method of using the display 10 disclosed in FIG. 2 described above, and the example disclosed in FIG. 5, it becomes possible to optimize the display image quality setting when displaying on a display in response to only the side which prepares the image contents.

Further, the settings when displaying the slide show are completed in the "step of preparing the image" for inserting in the USB memory, therefore, it becomes possible for the content implementor (personnel of the enterprise or agency displaying an advertisement) to comprehend the effect when actually displaying the content image at the time of preparation.

Second Embodiment

Figure 6:
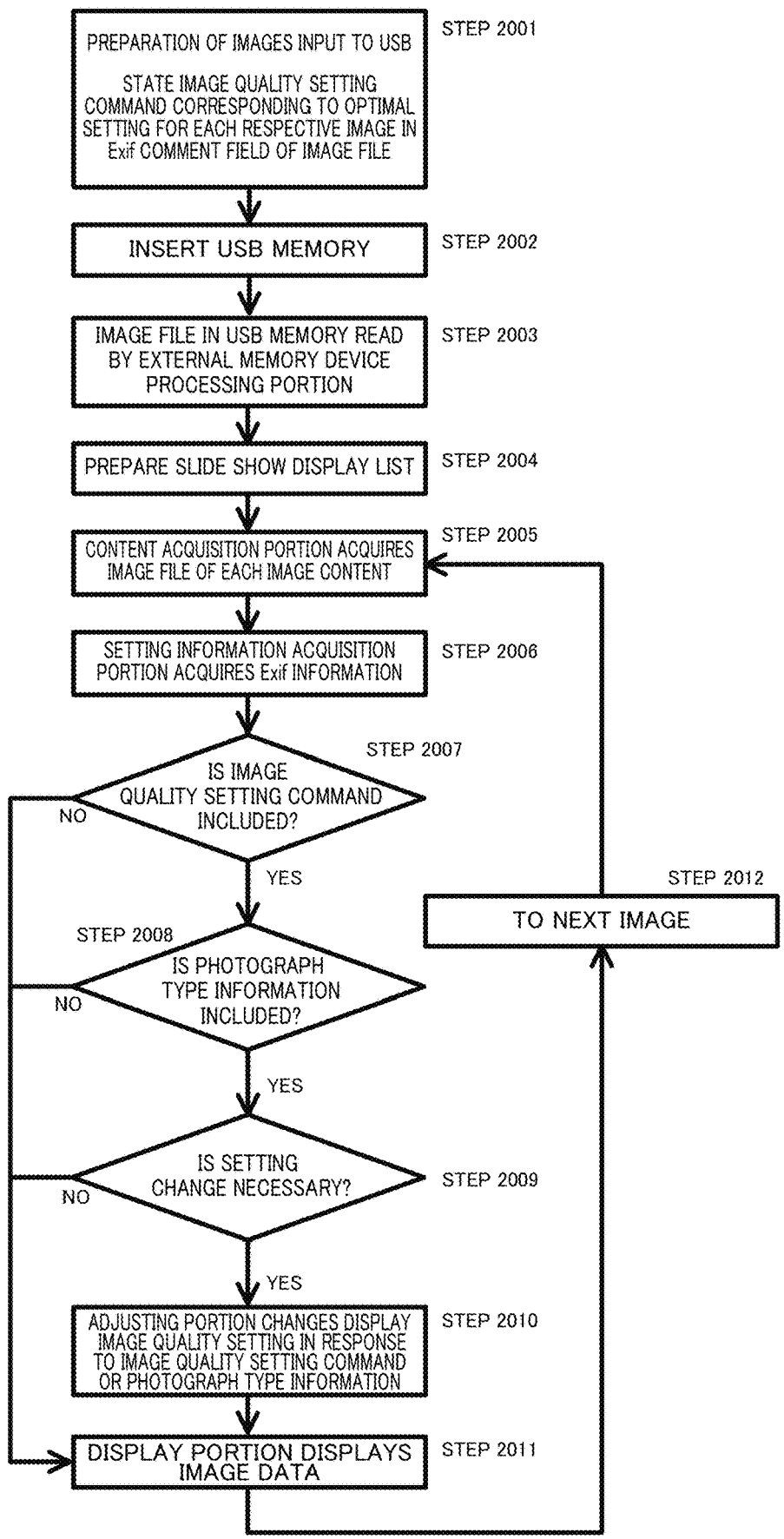
FIG. 6 is a drawing showing an operation flow of the image display device according to the second embodiment of the present invention.

FIG. 6 is a flow of the operation of the display according to the second embodiment of the present invention. Further, the constitution of the display itself is the same as the display 10 according to the first embodiment.

In the operation flow of FIG. 6, compared to the operation flow of FIG. 2, STEP 2001 to STEP 2007 of FIG. 6 are the same as STEP 1001 to STEP 1007 of FIG. 2, and explanations thereof are omitted.

In the STEP 1007 of the operation flow of FIG. 2 according to the first embodiment, if an image quality setting command is included in the comment field in the Exif information (STEP 1007 is Yes), the flow proceeds to STEP 1009, and if not included (STEP 1007 is No), the flow proceeds to STEP 1008. In contrast, in the second embodiment, in STEP 2007, if an image quality setting command is included in the comment field in the Exif information (STEP 2007 is Yes), the flow proceeds to STEP 2008, and if not included (STEP 2007 is No), the flow proceeds to STEP 2011.

Then, in STEP 2008, if it is judged that photograph type information is included in the Exif information (STEP 2008 is Yes), the flow proceeds to STEP 2009, and if it is judged that photograph type information is not included in the Exif information (STEP 2008 is No), the flow proceeds to STEP 2011.

Namely, in the first embodiment, if either one of an image quality setting command or photograph type information is included in the Exif information, the flow proceeds to STEP 1009, and it is judged whether or not a setting change is required, but in the second embodiment, only in the case that both an image quality setting command and photograph type information are included in the Exif information, the flow proceeds to STEP 2009, and it is judged whether or not a setting change is necessary.

Further, in the first embodiment, in STEP 1010, the adjustment portion changes the display image quality setting in response to either one of the image quality setting command or the photograph type information, but in the second embodiment, in STEP 2010, the adjustment portion changes the display image quality setting in response to both of the image quality setting command and the photograph type information.

Specifically, first, based on the table of FIG. 4, the judgment portion 130 judges whether the photograph type information stated in the Exif information corresponds to any of the display modes indicated in the "image quality switching commands" disclosed in FIG. 3. Next, the attribute value in the display mode judged in response to the photograph type information is taken as the standard value, and, from the standard value, the display mode is set to the value increased or decreased by only the increase or decrease value of the attribute indicated by the picture adjusting command in the image quality setting command stated in the Exif information. Here, provisionally, if the image quality switching command stated in the Exif information is taken as having been disclosed in the image quality setting command, the display mode corresponding to the photograph type information is given priority as the standard, and the image quality switching command is disregarded.

After this, STEP 2011 and STEP 2012 carry out the same operations and STEP 1011 and STEP 1012 of FIG. 2.

In this way, even assuming that the photograph type information is recorded in the image file corresponding to the displayed image, it becomes possible to respond to the case where it is desired to display while further changing the attribute values from the display mode corresponding to the photograph type information.

Third Embodiment

Figure 7:
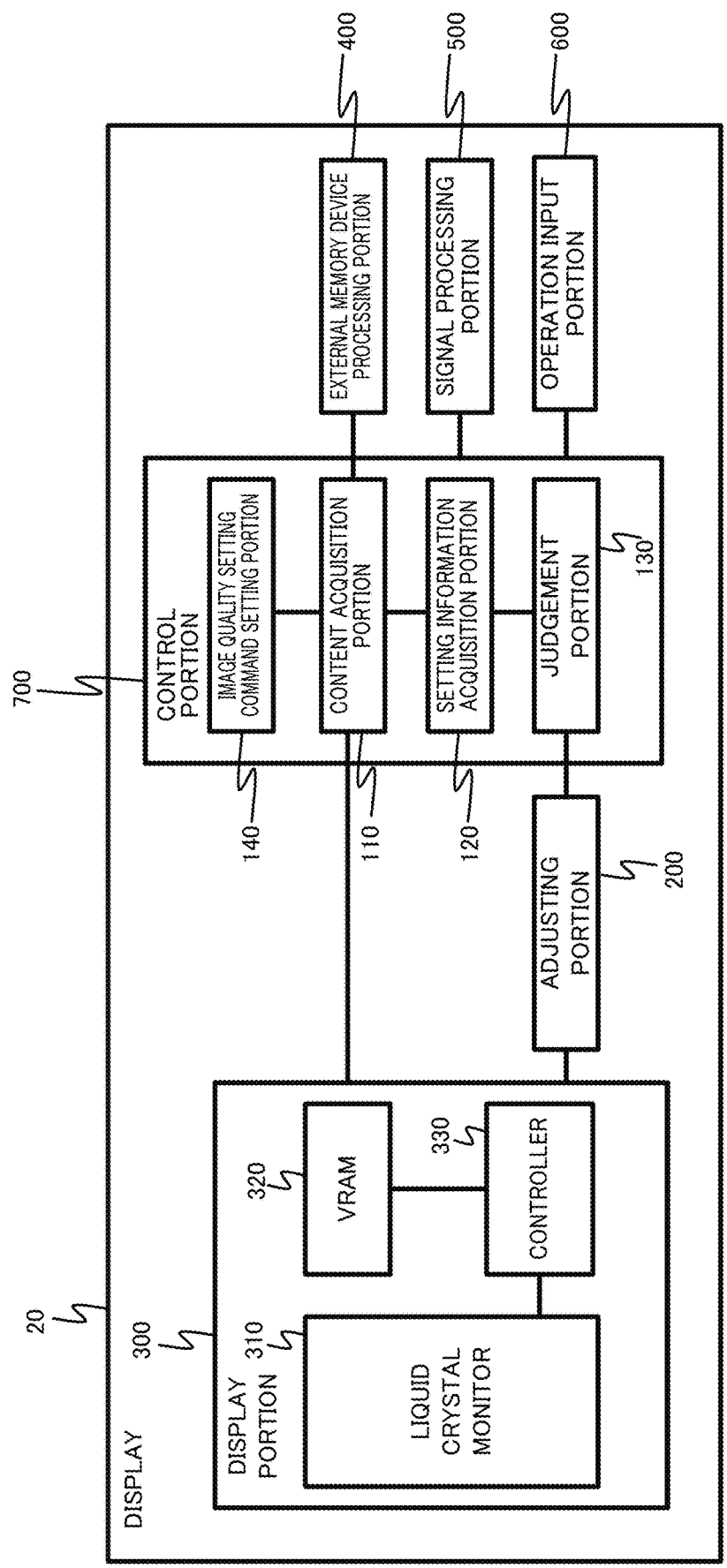
FIG. 7 is a block diagram of the image display device according to the third embodiment of the present invention.

FIG. 7 is a drawing showing the constitution of the display 20 according to the third embodiment of the present invention. Further, the constituent elements which are the same as those of the display 10 according to the first embodiment are shown using the same reference numbers.

The display 20 according to the third embodiment, compared to the display 10 according to the first embodiment, differs in the point that the control portion 700 has an image quality setting command setting portion 140 connected to the content acquisition portion 110.

This image quality setting command setting portion 140 is a constituent element which sets an image quality setting command in the Exif information of a transmitted image file or in a separate file linked to the transmitted file or the like, after the image file recorded in the USB or the like external memory device has been transmitted to the content acquisition portion 110 via the external memory device processing portion 400.

In this way, in the case that an image quality setting command is not stated in the Exif information of the image file recorded in advance in the external memory device, it becomes possible to set an image quality setting file after the fact. Further, even if an image quality setting command is set in the Exif information of the image file recorded in advance in an external memory device or in a separate file linked to this image file, if the user wishes to change the display image quality setting of individual displayed images after the execution of an automatic slide show, by setting an image quality setting command after the fact, it becomes possible to execute the automatic slide show with the display image quality desired by the user.

Fourth Embodiment

Figure 8:
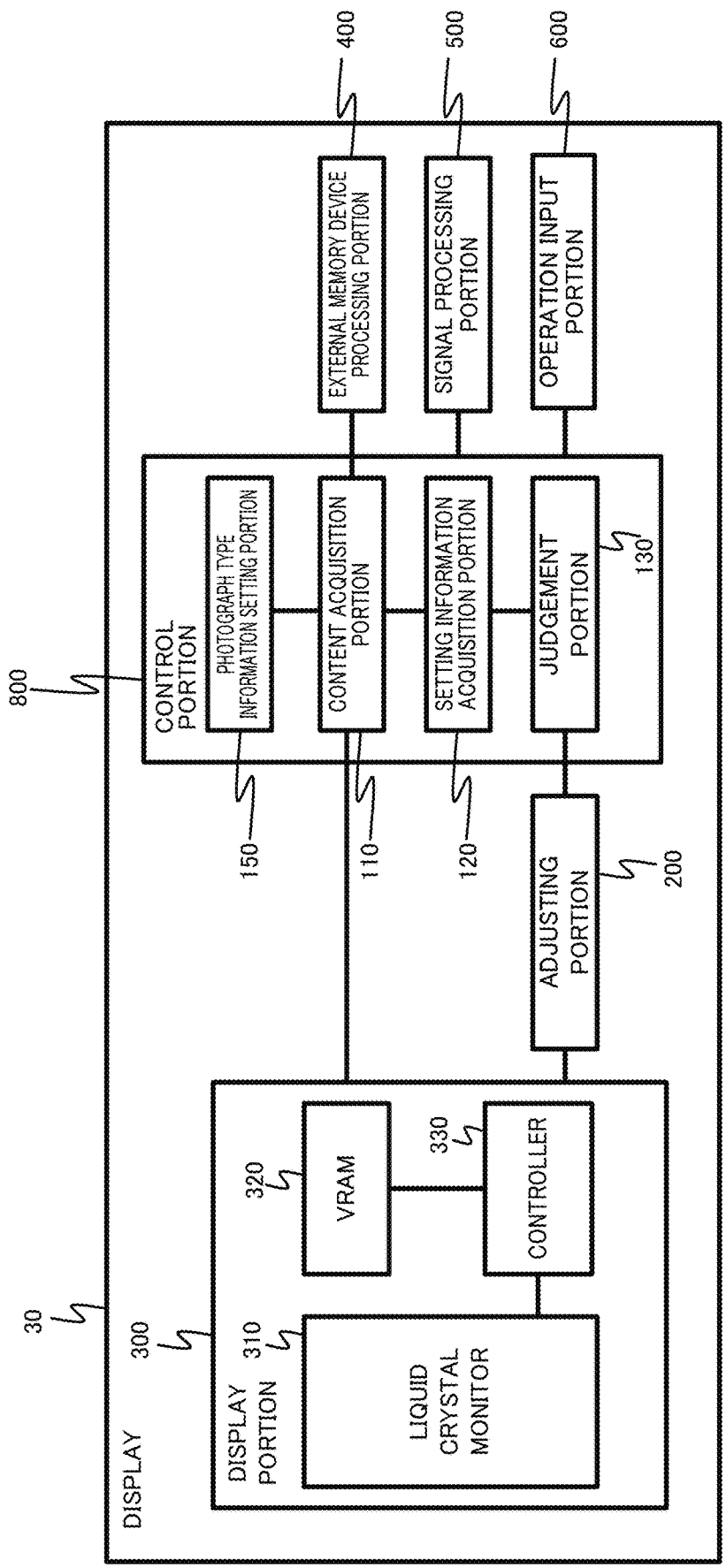
FIG. 8 is a block diagram of the image display device according to the fourth embodiment of the present invention.

FIG. 8 is a drawing showing the constitution of the display 30 according to the fourth embodiment of the present invention. Further, the constituent elements which are the same as those of the display 10 according to the first embodiment are shown using the same reference numbers.

The display 30 according to the fourth embodiment, compared to the display 10 according to the first embodiment, differs in the point that the control portion 800 has a photograph type information setting portion 150 connected to the content acquisition portion 110.

This photograph type information setting portion 150 is a constituent element which sets photograph type information in the Exif information of a transmitted image file after the image file recorded in the USB or the like external memory device has been transmitted to the content acquisition portion 110 via the external memory device processing portion 400.

In this way, in the case that photograph type information is not stated in the Exif information of the image file recorded in advance in the external memory device, it becomes possible to set photograph type information after the fact. Especially, this is useful if neither an image quality setting command nor photograph type information is stated in the Exif information of the image file, and the user is also not familiar with the inherent display modes of the display 30, but is familiar with the photograph types used in the camera which has photographed each image.

Fifth Embodiment

Figure 9:
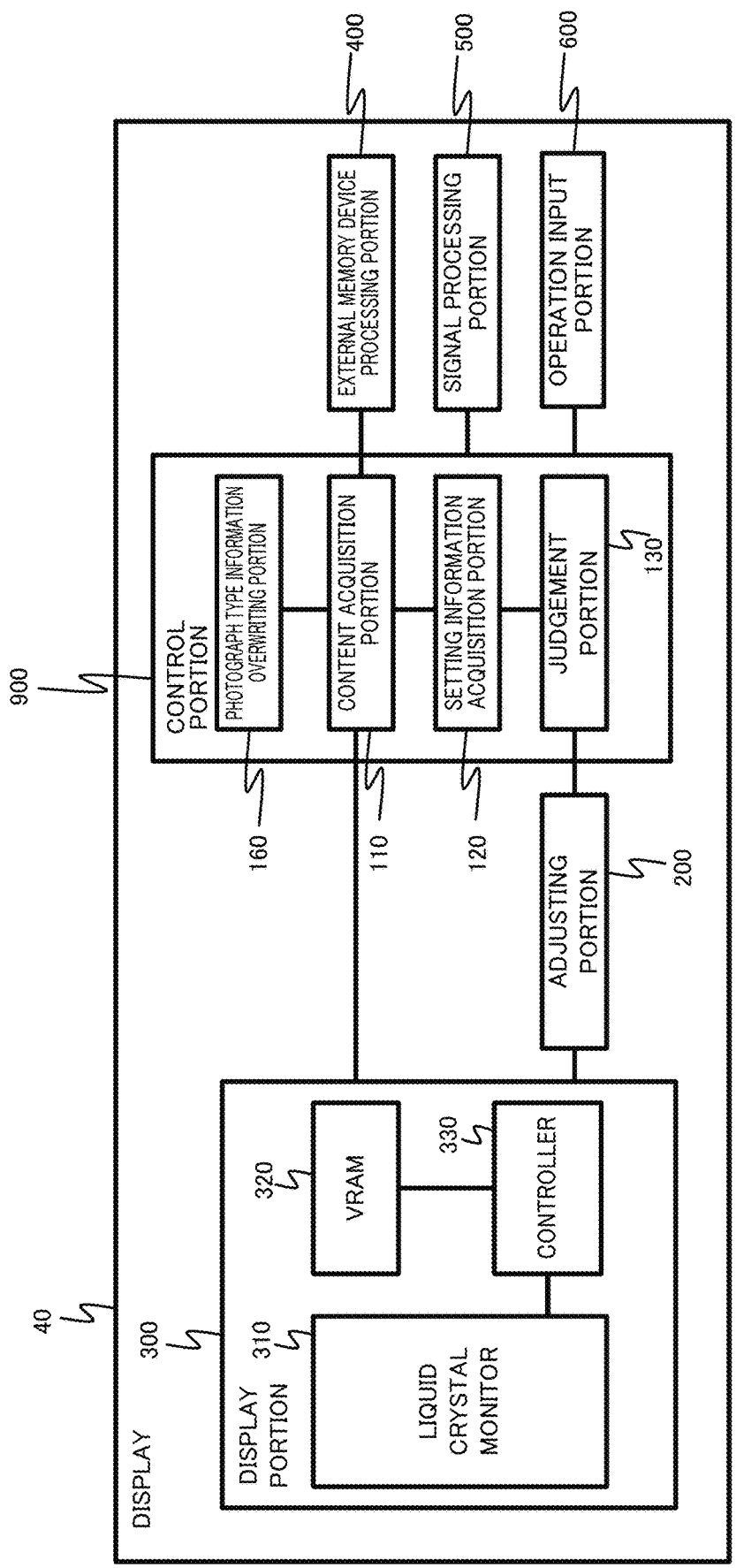
FIG. 9 is a block diagram of the image display device according to the fifth embodiment of the present invention.

FIG. 9 is a drawing showing the constitution of the display 40 according to the fifth embodiment of the present invention. Further, the constituent elements which are the same as those of the display 10 according to the first embodiment are shown using the same reference numbers.

The display 40 according to the fifth embodiment, compared to the display 10 according to the first embodiment, differs in the point that the control portion 900 has a photograph type information overwriting portion 160 connected to the content acquisition portion 110.

The photograph type information overwriting portion 160 is a constituent element which overwrites the photograph type information stated in the Exif information of a transmitted image file after the image file recorded in the USB or the like external memory device has been transmitted to the content acquisition portion 110 via the external memory device processing portion 400.

In this way, it becomes possible to overwrite, after the fact, the photograph type information stated in the Exif information of the image file recorded in advance in the external memory device. Further, if the photograph type information is stated in the Exif information of the image file recorded in advance in the external memory device, but the user wishes to change the display image quality setting of an individual displayed image after executing an automatic slide show, it becomes possible to execute the automatic slide show in the display mode desired by the user by overwriting the photograph type information after the fact. In particular, this is useful in the case that the user is not familiar with the inherent image quality modes in the display 40, but is familiar with the photograph types used in the camera which photographed each image.

Further, each portion of the above described image adjusting device and image display device can be implemented by hardware, software, or a combination thereof. Further, the signal processing method carried out by the above described signal processing device can also be implemented by hardware, software, or a combination thereof. Herein, implementation by hardware means execution by a computer reading and executing a program.

The program may be stored using various types of non-transitory computer readable media, and supplied to the computer. The non-transitory computer readable media include various types of tangible storage media. Examples of the non-transitory computer readable media are magnetic storage media (for example, flexible disks, magnetic tape, hard disk drives), magneto-optical storage media (for example, magneto-optical disks), CD-ROM (Read Only Memory), CD-R, CD-R/W, semiconductor memory (for example, mask ROM, PROM (Programmable ROM), EPROM (Erasable PROM), flash ROM, RAM (Random Access Memory)). Further, the program may also be supplied to the computer by various types of transitory computer readable media. Examples of transitory computer readable media are electric signals, optical signals, and electromagnetic signals. Transitory computer readable media can supply a program to the computer via cable communications such as electric cables and optical fibers, or wireless communication.

The present invention may be used in an image display device such as a signage display or the like. Further, it may also be used for an image display in a different field, for example, and automatic slide show on an ordinary personal computer. Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

What is claimed is:

1. An image display device for displaying a plurality of images by a slide show, comprising:
    a content acquisition circuitry which acquires a plurality of image files including image data;
    a determination circuitry which determines whether an image quality setting information is contained in or related to a respective image file included in the plurality of image files;
    an adjusting circuitry which makes adjustment of the image data based on the image quality setting information for the respective image file containing the image quality setting information, and makes adjustment of the image data based on image quality setting information generated when an image corresponding to the image data was taken for the respective image file not containing the image quality setting information,
    wherein the content acquisition circuitry further acquires a plurality of image quality adjustment command sets, each of which is contained in or related to the respective image file, as the image quality setting information,
    the image quality adjustment command set comprises an image quality setting command as the image quality setting information contained in the respective image file,
    the adjusting circuitry makes the adjustment of the image data based on the image quality setting command for respective image file containing the image quality setting information,
    the image quality setting command comprises one or more picture adjusting commands, and
    the picture adjusting command comprises a set of one of attributes of an image and an increase or decrease value from a standard value of said one of attributes.

2. The image display device according to claim 1, wherein the information is pursuant to a prescribed standard.

3. The image display device according to claim 1, wherein the image quality setting command comprises an image quality switching command, and
    the image quality switching command comprises a plurality of sets of attribute types and attribute values.

4. The image display device according to claim 1, wherein the image quality setting command is contained in the image file corresponding to the individual image.

5. The image display device according to claim 1, wherein the image quality setting command is included in a file separated from the image file and which is related to the image file corresponding to the individual image.

6. The image display device according to claim 1, wherein the image quality setting command is embedded in the individual image itself.

7. The image display device according to claim 1, wherein the image quality adjustment command set comprises a photograph type information as the image quality setting information related to in the respective image file, said photograph type information being set by a photographer when photographing the individual image, and
    the adjusting circuitry makes the adjustment of the image data based on the photograph type information for respective image file not containing the image quality setting information.

8. The image display device according to claim 7, further comprising:
    a photograph type information setting circuitry which makes the photograph type information associated with an image on image by image basis.

9. The image display device according to claim 7, further comprising:
    a photograph type information changing circuitry which changes at least a part of a photograph type information set by a camera.

10. The image display device according to claim 1, further comprising:
    an image quality setting command setting circuitry which makes the image quality setting command associated with an image on image by image basis.

11. The image display device according to claim 1, further comprising:
    a display circuitry which sequentially displays the plurality of images corresponding to the respective image data adjusted by the adjusting circuitry.

12. A method for displaying a plurality of images by a slide show, comprising:
    acquiring a plurality of image files including image data;
    determining whether an image quality setting information is contained in or related to a respective image file included in the plurality of image files;
    an adjusting step of making adjustment of the image data based on the image quality setting information for the respective image file containing the image quality setting information, and making adjustment of the image data based on image quality setting information generated when an image corresponding to the image data was taken for the respective image file not containing the image quality setting information;
    acquiring a plurality of image quality adjustment command sets, each of which is contained in or related to the respective image file, as the image quality setting information,
    wherein the image quality adjustment command set comprises an image quality setting command as the image quality setting information contained in the respective image file, and
    making the adjustment of the image data based on the image quality setting command for respective image file containing the image quality setting information,
    wherein the image quality setting command comprises one or more picture adjusting commands, and
    wherein the picture adjusting command comprises a set of one of attributes of an image and an increase or decrease value from a standard value of said one of attributes.

13. A non-transitory storage medium storing a program for making a computer function as an image display device for displaying a plurality of images by a slide show, comprising:
    a content acquisition circuitry which acquires a plurality of image files including image data;
    a determination circuitry which determines whether an image quality setting information is contained in or related to a respective image file included in the plurality of image files; and an adjusting circuitry which makes adjustment of the image data based on the image quality setting information for the respective image file containing the image quality setting information, and makes adjustment of the image data based on image quality setting information generated when an image corresponding to the image data was taken for the respective image file not containing the image quality setting information, wherein the content acquisition circuitry further acquires a plurality of image quality adjustment command sets, each of which is contained in or related to the respective image file, as the image quality setting information, the image quality adjustment command set comprises an image quality setting command as the image quality setting information contained in the respective image file, the adjusting circuitry makes the adjustment of the image data based on the image quality setting command for respective image file containing the image quality setting information, the image quality setting command comprises one or more picture adjusting commands, and the picture adjusting command comprises a set of one of attributes of an image and an increase or decrease value from a standard value of said one of attributes.

* * * * *